No. 829,680. PATENTED AUG. 28, 1906.
E. E. STOUFFER.
SELF OILING WHEEL.
APPLICATION FILED NOV. 16, 1905.
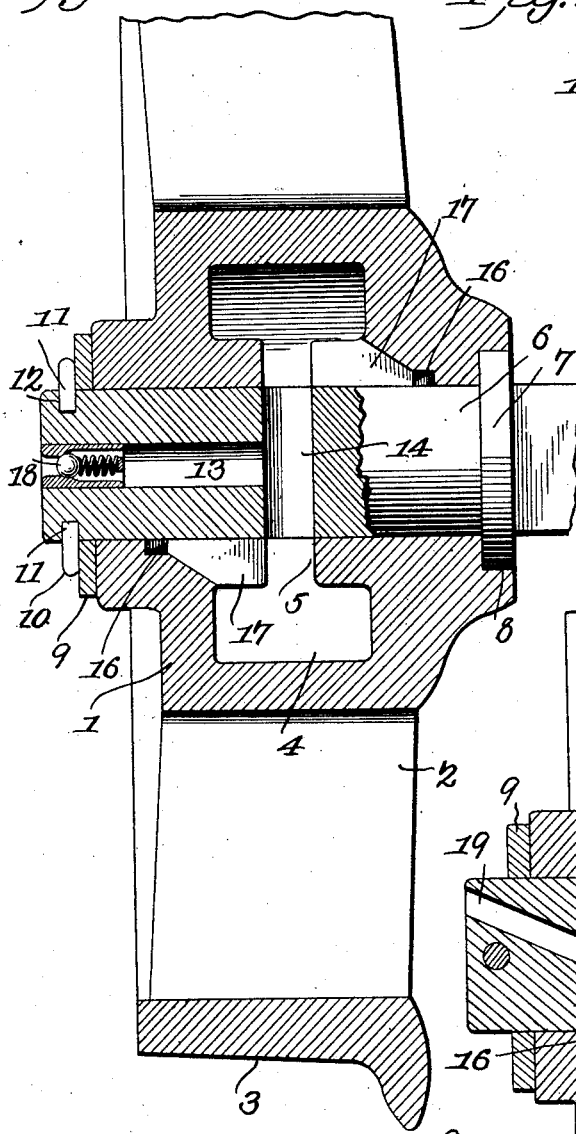
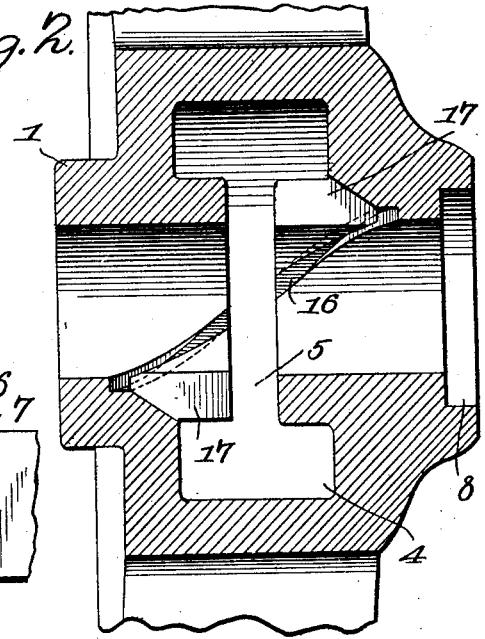
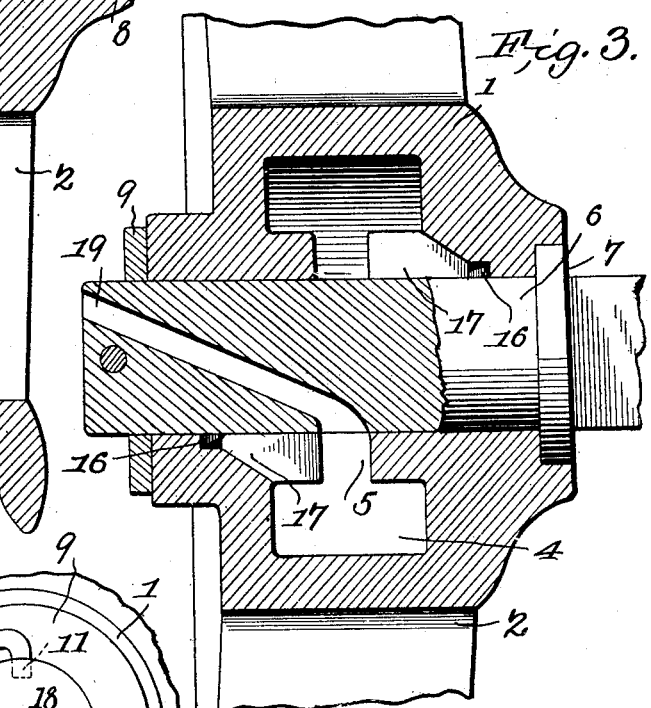
WITNESSES:
Elmer E. Stouffer,
INVENTOR,
By C. A. Snow & Co
ATTORNEYS.

UNITED STATES PATENT OFFICE.

ELMER E. STOUFFER, OF MINERAL RIDGE, OHIO.

SELF-OILING WHEEL.

No. 829,680.   Specification of Letters Patent.   Patented Aug. 28, 1906.

Application filed November 16, 1905. Serial No. 287,710.

*To all whom it may concern:*

Be it known that I, ELMER E. STOUFFER, a citizen of the United States, residing at Mineral Ridge, in the county of Trumbull and State of Ohio, have invented a new and useful Self-Oiling Wheel, of which the following is a specification.

This invention relates generally to self-oiling wheels, and more particularly to certain improvements used in connection with mine-car wheels.

The object of the invention is in a certain and practical manner, and without waste of the lubricant, to effect thorough oiling of the axle and axle-box.

With the above and other objects in view, as will appear as the nature of the invention is better understood, the same consists in the novel construction and combination of parts of a self-oiling mine-car wheel, as will be hereinafter fully described and claimed.

In the accompanying drawings, forming a part of this specification, and in which like characters of reference indicate corresponding parts, Figure 1 is a view in vertical longitudinal section through a portion of a mine-car wheel equipped with the improvements of the present invention. Fig. 2 is a similar view with the axle omitted in order to show more clearly the means for distributing the lubricant throughout the length of the axle and axle-box. Fig. 3 is a view similar to Fig. 1, showing a slightly-modified form of the invention. Fig. 4 is a view in end elevation, showing more particularly the means for holding the wheel upon the axle.

Referring to the drawings, 1 designates the hub of an ordinary mine-car wheel, 2 the spokes thereof, and 3 the tread. As usual these parts are made of cast-iron and form an integral structure, although this is not essential, as they may be made as separate elements and be suitably assembled.

The hub is provided with an annular oil-chamber 4, with which communicates an annular channel 5, through which the oil is supplied initially to the chamber and from which the oil escapes to the axle 6. The axle is provided at one end with the usual collar 7, which fits in a recess 8 in the hub provided for the purpose and at its other end projects beyond the hub and has combined with it a washer 9, that is held in position upon the axle by a clip 10, the terminals 11 of which are seated in alined sockets 12, formed in the outer end of the axle. The axle is provided with a longitudinal bore 13, which communicates with a transverse bore 14, that is adapted to register with the channel 5, and thus supply the oil to the chamber 4.

As will be apparent, there need be no means provided to prevent the lubricant from escaping from the chamber 4 out through the bore 14, thence to the bore 13, and thence without the axle, as, by taking advantage of the well-known centrifugal law that under rotation liquids are thrown away from an axis, so long as the wheel is revolving the oil will closely hug the outer wall of the chamber 4, and when the wheel is at rest it will settle to the lower portion of the chamber, and thus be below the plane of the bore 13. Of course it will be obvious that there will always be a small amount of oil that will escape to the channel 5, and it is this portion of the lubricant that is utilized for lubricating the axle and hub.

In order to cause the proper distribution of the lubricant throughout the entire length of the spindle or axle, the hub is provided, as shown in Fig. 2, with a longitudinally-disposed spiral groove or duct 16, the terminals of which communicate with pockets or chambers 17, formed in the diagonally opposite walls of the channel 5, the pockets being substantially of the same width as the groove.

As a matter of precaution, to preclude entrance of dust to the oil-chamber the bore 13 is provided with a spring-seated valve 18, which will be unseated by the nozzle of the oil-can when lubricant is supplied to the oil-chamber.

In the form of the invention shown in Fig. 3 the same general construction of wheel is employed and also the axle, the only difference being that instead of having the bore 19, that corresponds with the bore 13, disposed longitudinally of the axle it is disposed obliquely thereto, and as the axle is stationary it will be seen by this arrangement that even when the oil-chamber is filled to its capacity there can be no escape of oil through the said bore. In this latter form of the invention the valve for closing the bore is omitted; but it is to be understood that it may be employed, if preferred, and still be within the scope of the invention.

From the foregoing description it will be seen that while the improvements herein defined are simple in character they will be thoroughly efficient for the purpose designed and may be readily applied to an ordinary mine-car wheel and its axle without involving any extended change in the structural arrangement of the parts.

I claim—

1. A mine-car wheel having its hub provided with an oil-chamber, with a spirally-arranged groove, and with pockets communicating with the groove, in combination with an axle having a bore communicating with the chamber.

2. A mine-car wheel having its hub provided with an oil-chamber, with a spirally-arranged groove and with a channel communicating with the chamber, in combination with an axle having a transverse bore communicating with the channel and a longitudinal bore communicating with the transverse bore.

3. A mine-car wheel having its hub provided with an oil-chamber, with a spirally-arranged groove, and with an annular channel communicating with the chamber, in combination with an axle having a transverse bore communicating with the channel, and a longitudinal bore communicating with the transverse bore, and means coacting with the longitudinal bore to preclude entrance of dust to the chamber.

In testimony that I claim the foregoing as my own I have hereto affixed my signature in the presence of two witnesses.

ELMER E. STOUFFER.

Witnesses:
J. ROSS COLHUM,
C. E. DOYLE.